Patented Feb. 23, 1937

2,071,803

UNITED STATES PATENT OFFICE 2,071,803

ACYL OCTAHYDRO FOLLICLE HORMONES AND THEIR PRODUCTION

Friedrich Hildebrandt, Hohen Neuendorf, near Berlin, Germany, assignor to Schering-Kahlbaum A. G., Berlin, Germany, a corporation of Germany No Drawing. Application November 3, 1934, Serial No. 752,014. In Germany November 9, 1933

26 Claims. (Cl. 260—106)

The present invention relates to new derivatives of hydrogenation products of the follicle hormone and more particularly to acyl derivatives of octahydro follicle hormone and a method of making the same, the present application being a continuation in part of my copending application Serial No. 723,898, filed May 4, 1934.

According to the process described in said application Serial No. 723,898 acyl octahydro follicle hormones are produced by treating the acyl dihydro follicle hormones with catalytically activated hydrogen, whereby the unsaturated first or benzene ring present in the cyclopentanophenanthrene structure of the starting material is hydrogenated into a hydroaromatic ring.

Now I have found that the esters of the octahydro follicle hormones can also be produced by subjecting the octahydro follicle hormones to the action of acylating agents, whereby depending upon the reaction conditions mono- or diacyl products of the octahydro follicle hormone are obtained.

I have furthermore found that the monoacyl derivatives of the octahydro follicle hormone can be obtained when the acyl derivatives of the follicle hormone, its isomers and similar products are hydrogenated until the keto group of the follicle hormone is transformed into a secondary alcohol group while simultaneously the phenol ring in the molecule is completely saturated. For this purpose, acyl derivatives of the follicle hormone are subjected to catalytic hydrogenation in the presence of suitable catalysts. Such catalysts are noble metal catalysts as, for instance, platinum black or colloidal platinum, as well as heavy metal catalysts, especially nickel with additions of copper, manganese, chromium, and the like. According to the reaction taking place at ordinary or at elevated pressure, suitable solvents may be used, for instance glacial acetic acid, ethanol, cyclohexanol, and the like, which are selected in accordance with the reaction conditions, whether taking place at ordinary or elevated temperature and pressure.

Diacyl derivatives of the octahydro follicle hormones can also be obtained by hydrogenating the diacyl products of the dihydro follicle hormone $C_{18}H_{24}O_2$, its isomers and female germinal gland hormones of analogous structure which contain further double bonds in the nucleus besides the unsaturated first or benzene ring, until they are completely saturated. For this purpose those methods are employed which are ordinarily used for hydrogenating aromatic compounds, especially catalytic methods. The hydrogenation may be carried out at an elevated pressure when using heavy metal catalysts such as, for instance, nickel with various additions (chromium, copper, manganese), or at atmospheric pressure in the presence of noble metal catalysts.

The hydrogenation should be carried out in such a manner and under such conditions that hydrogen is added to the unsaturated molecule without, however, splitting off oxygen.

As reaction products resinous compounds are obtained which represent mixtures of various isomeric diacyl octahydro follicle hormones and which exhibit a physiological action similar to that of the male germinal gland hormone.

The term "follicle hormone" as used hereinafter in the specification and in the claims includes not only the follicle hormone of the formula $C_{18}H_{22}O_2$, but also the isomers and other products of similar chemical constitution, such as for instance the unsaturated follicle hormones, equilin $C_{18}H_{20}O_2$ and hippolin $C_{18}H_{18}O_2$ and similar unsaturated hydroxy cyclopentano phenanthrene compounds having the physiological action of hormones, regardless of whether these compounds are obtained from natural sources, such as urine, organs and the like, or synthetically.

The term "dihydro follicle hormone" as used hereinafter in the specification and in the claims includes not only the dihydro follicle hormone of the formula $C_{18}H_{24}O_2$, but also other products of similar physiological properties and the same general chemical structure (cyclopentano phenanthrene nucleus) which contain a secondary hydroxyl group in their molecule, as they are obtained by gentle hydrogenation of the above described follicle hormones, the first or unsaturated six-carbon ring of the cyclopentano phenanthrene nucleus of the hormone remaining unaffected.

The terms "acylation process" and "acylating agent" as used hereinafter in the specification and the claims include the known processes and agents for introducing an acyl group into a compound. The acylation may be carried out by using the acid anhydride or the acid chloride or the acid itself as acylating agents in the presence or absence of catalysts or in any other known manner.

In order to illustrate the invention the following examples are given without, however, limiting the invention to them:

*Example 1*

1 gram of octahydro follicle hormone of the formula $C_{18}H_{30}O_2$ is dissolved in 5 cc. of pyridine, an excess of benzoyl chloride (about 1 cc.) is added to this solution, and the reaction mixture is kept at room temperature for three days. Thereupon the reaction liquid is poured into dilute sulfuric acid while cooling and the reaction product is isolated by extracting with ether and evaporating the ether. The product contains dibenzoyl octahydro follicle hormone which can be separated in known manner.

Example 2

1 gram of a mixture of various isomeric octahydro follicle hormones, obtained for instance by catalytic hydrogenation of the follicle hormone, is heated with 50 cc. of freshly distilled acetic acid anhydride and some anhydrous sodium acetate for three hours under reflux to boiling. After cooling, the reaction liquid is poured into water and, after standing for some time, the reaction product is taken up in ether. The ethereal solution is washed with dilute soda solution and with water, whereupon it is dried and evaporated. A resinous product remains as residue.

Besides benzoyl chloride and acetic anhydride there may also be used as acylating agents, for instance, acetylchloride, phthalic acid anhydride, toluene sulfonic acid chloride, palmitic acid chloride, and other acylating agents.

Example 3

1 gram of follicle hormone acetate of the melting point 126° C. is dissolved in 100 cc. of 96% alcohol and the solution is heated with 1 gram of a previously reduced nickel-chromium catalyst at 100 atm. pressure of hydrogen at 180° C. in an autoclave which is provided with a stirring device. When the absorption of the hydrogen ceases, the catalyst is separated by filtration from the reaction liquid and the latter is evaporated to dryness in a vacuum. The remaining residue is of resinous consistency and in the capon comb test has an activity similar to that of the male germinal gland hormone.

Example 4

0.5 gram of follicle hormone benzoate of the melting point 216-219° C. is dissolved in glacial acetic acid and the solution is shaken with a colloidal solution of platinum in a hydrogen atmosphere according to Skita and Meyer (Berichte 45, 3589, 1912). When the hydrogen absorption ceases, the reaction product is worked up in a known manner. The reaction product is a mixture of monohexahydro benzoic acid esters of various isomeric octahydro follicle hormones.

Example 5

500 milligrams of dihydro follicle hormone diacetate are hydrogenated with 150 cc. of cyclohexanol and 500 milligrams of a previously reduced nickel-chromium catalyst at 100 atm. and 180° C. in an autoclave which is provided with a stirring device. When the hydrogen absorption ceases, the reaction solution is freed from the catalyst by filtration and is evaporated to dryness in a vacuum. As residue there remains a clear viscous resin which consists of a mixture of various isomeric octahydro follicle hormone diacetates.

Example 6

0.5 gram of monoacetyl octahydro follicle hormone obtained, for example, by the reduction of the follicle hormone acetate, for instance according to Example 3 of this application, or by dissolving the monoacetyl dihydro follicle hormone in glacial acetic acid and subjecting it to the action of hydrogen at room temperature in the presence of platinum oxide as a catalyst, as described in Example 3 of my copending application Serial No. 723,898, is dissolved in 20 grams of pure pyridine, to which solution there is added five times the calculated amount of benzoyl-chloride. After allowing the reaction mixture to stand for several hours at room temperature, a resinous reaction product representing the benzzoyl acetyl octahydro follicle hormone is isolated by pouring the reaction liquid into dilute hydrochloric acid, extracting with ether and evaporating the ether.

Example 7

1 gram of octahydro follicle hormone is dissolved in 30 cc. of pyridine; to this solution there is added an excess of salicylic acid chloride in 60 cc. of benzene whereupon the reaction mixture is heated for 3 hours under reflux on the water bath. The reaction liquid is then diluted with ether, the ethereal solution is treated first with 5% soda solution and then with 5% dilute hydrochloric acid. The remaining benzene-ether extract is washed with water, dried and evaporated, yielding a residue which represents the salicylic acid ester of the octahydro follicle hormone.

Example 8

1 gram of a mixture of isomeric octahydro follicle hormones is fused with the calculated amount of phthalic acid anhydride at 150° C. in an oil bath. After cooling, the fused mass is distributed between ether and soda solution. The soda-soluble portion is acidified whereby the reaction product containing small amounts of non-reacted phthalic acid is precipitated and purified by sublimation in a high vacuum. Thus, a mixture of isomeric acid phthalic acid esters of octahydro follicle hormone is obtained.

Attention is called to the fact that the hydrogenation of acyl derivatives of partially hydrogenated follicular hormones, specifically of dihydrofollicle hormones, is claimed in my application Serial No. 723,898 referred to above, while the acylation and hydrogenation, in any order, of follicular hormones is claimed broadly herein.

Of course, the given examples serve merely to illustrate the invention; various other modifications and changes in the processes and reagents may be made by those skilled in the art in accordance with the principles set forth herein and in the claims annexed hereto.

What I claim is:

1. A method for the production of acyl octahydro follicle hormones, consisting in subjecting the octahydro follicle hormones of the general formula $C_{18}H_{30}O_2$ to the action of acylating agents.

2. A method for the production of acyl octahydro follicle hormones, consisting in subjecting the octahydro follicle hormones of the general formula $C_{18}H_{30}O_2$ to the action of acylating agents in the presence of a solvent.

3. A method for the production of acyl octahydro follicle hormones, consisting in subjecting the octahydro follicle hormones of the general formula $C_{18}H_{30}O_2$ to the action of acylating agents in the presence of a solvent and isolating the acylated product.

4. A method for the production of acyl octahydro follicle hormones, consisting in subjecting the octahydro follicle hormones of the general formula $C_{18}H_{30}O_2$ to the action of acylating agents in the presence of a catalyst and isolating the acylated compound.

5. A method for the production of acyl octahydro follicle hormones, consisting in subjecting the monoacyl octahydro follicle hormones of the general formula $C_{18}H_{29}O_2X$, wherein X represents an acyl group, to the action of acylating agents.

6. A method for the production of acyl octahydro follicle hormones, consisting in subjecting the acyl derivatives of compounds belonging to the group of compounds consisting of the follicle hormones $C_{18}H_{22}O_2$, $C_{18}H_{20}O_2$ and $C_{18}H_{18}O_2$, their isomers and unsaturated compounds having 18 carbon and 2 oxygen atoms and of similar cyclopentano phenanthrene structure, to the action of hydrogenation agents capable of reducing the keto group of said compounds into the secondary alcohol group and of completely hydrogenating the benzene nucleus and the double bonds present in the molecule of said compounds.

7. A method for the production of acyl octahydro follicle hormones, consisting in subjecting the acyl derivatives of compounds belonging to the group of compounds, consisting of the follicle hormones $C_{18}H_{22}O_2$, $C_{18}H_{20}O_2$ and $C_{18}H_{18}O_2$, their isomers and unsaturated compounds having 18 carbon and 2 oxygen atoms and of similar cyclopentano phenanthrene structure in the presence of hydrogenation catalysts to the action of such amounts of hydrogen that the keto group of said compounds is reduced to the secondary alcohol group and the benezene nucleus and the double bonds present in the molecule of said compounds are completely hydrogenated.

8. A method for the production of acyl octahydro follicle hormones, consisting in subjecting the acyl derivatives of compounds belonging to the group of compounds consisting of the follicle hormones $C_{18}H_{22}O_2$, $C_{18}H_{20}O_2$ and $C_{18}H_{18}O_2$, their isomers and unsaturated compounds having 18 carbon and 2 oxygen atoms and of similar cyclopentano phenanthrene structure, in the presence of hydrogenation catalysts to the action of such amounts of hydrogen that the keto group of said compounds is reduced to the secondary alcohol group and the benzene nucleus and the double bonds present in the molecule of said compounds are completely hydrogenated, said hydrogenation taking place at superatmospheric pressure and an elevated temperature.

9. A method for the production of diacyl octahydro follicle hormones, consisting in subjecting the monoacyl derivatives of compounds belonging to the group of compounds consisting of the follicle hormones $C_{18}H_{22}O_2$, $C_{18}H_{20}O_2$ and $C_{18}H_{18}O_2$, their isomers and unsaturated compounds having 18 carbon and 2 oxygen atoms and of similar cyclopentano phenanthrene structure, to the action of hydrogenation agents capable of reducing the keto group of said compounds into the secondary alcohol group and of completely hydrogenating the benzene nucleus and the double bonds present in the molecule of said compounds, and thereupon to the action of acylating agents, thereby producing diacyl compounds.

10. A method for the production of diacyl octahydro follicle hormones, consisting in subjecting the monoacyl derivatives of the dihydrofollicle hormone to the action of hydrogenating agents under conditions whereby the benzene nucleus present in the starting material is completely hydrogenated, and thereupon to the action of acylating agents, thereby producing diacyl compounds.

11. A method for the production of acyl octahydro follicle hormones, consisting in subjecting the octahydro follicle hormones of the structural formula

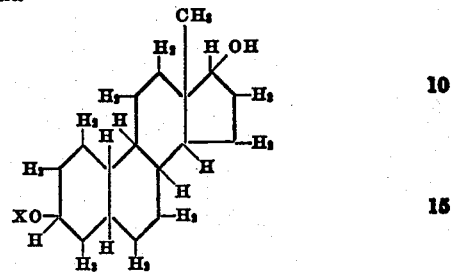

wherein X represents either hydrogen or an acyl group, to the action of acylating agents belonging to the group of compounds consisting of organic acid anhydrides and chlorides in the presence of an organic solvent capable of dissolving said octahydro follicle hormone and acylating agent, and separating and isolating the acylation product having the structural formula

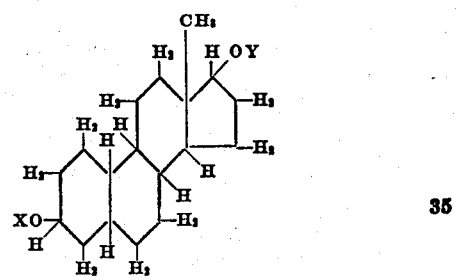

wherein X and Y represent acyl groups.

12. A method for the production of acyl octahydro follicle hormones, consisting in subjecting the octahydro follicle hormones of the structural formula

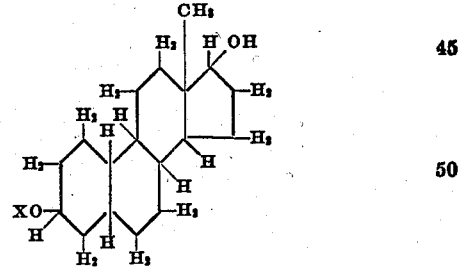

wherein X represents either hydrogen or an acyl group, to the action of acylating agents belonging to the group of compounds consisting of organic acid anhydrides and chlorides in the presence of a catalyst capable of accelerating the speed of acylation and an organic solvent capable of dissolving said octahydro follicle hormone and acylating agent, and separating and isolating the acylation product having the structural formula

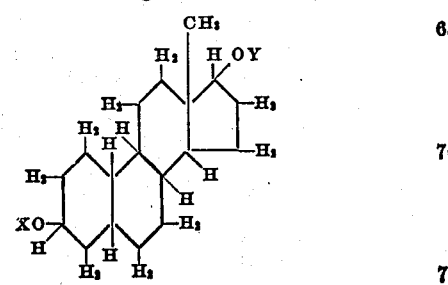

wherein X and Y represent acyl groups.

13. A method for the production of acyl octahydro follicle hormones, consisting in reacting acyl derivatives of follicle hormones of the structural formula

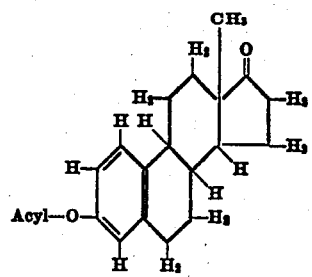
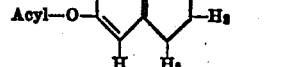

in the presence of a hydrogenation catalyst with such amounts of catalytically activated hydrogen that the keto group is reduced to the secondary alcohol group and the benzene nucleus is completely hydrogenated, and separating and isolating the reaction product having the structural formula

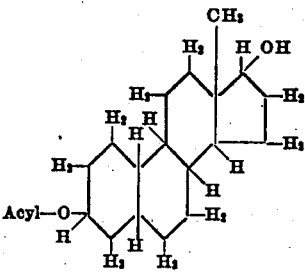
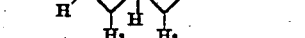

14. A method for the production of acyl octahydro follicle hormones, consisting in reacting acyl derivatives of follicle hormones of the structural formula

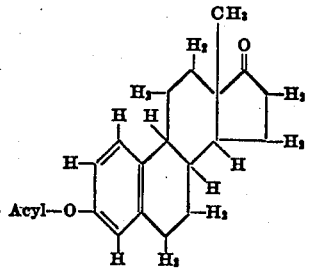
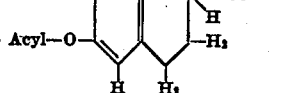

in the presence of a hydrogenation catalyst and an organic solvent capable of dissolving said starting material, with such amounts of catalytically activated hydrogen that the keto group is reduced to the secondary alcohol group and the benzene nucleus in completely hydrogenated, and separating and isolating the reaction product having the structural formula

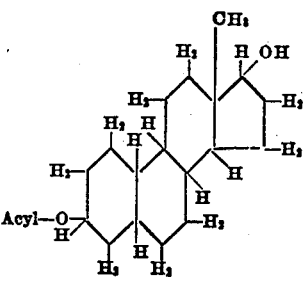
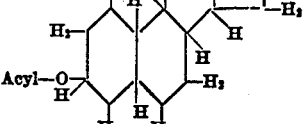

15. Acyl octahydro follicle hormones having the structural formula

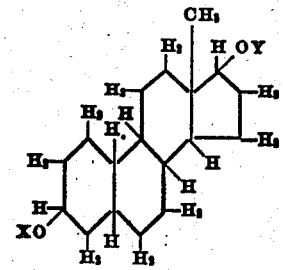

wherein X indicates an acyl group and Y either hydrogen or an acyl group, said compounds being of a physiological activity like that of the male germinal gland hormone.

16. Diacetyl octahydro follicle hormones of the following structural formula

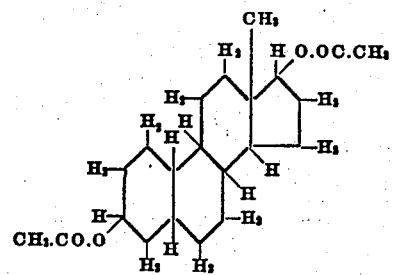

and having a physiological activity similar to that of the male germinal gland hormone.

17. Dibenzoyl octahydro follicle hormones of the following structural formula

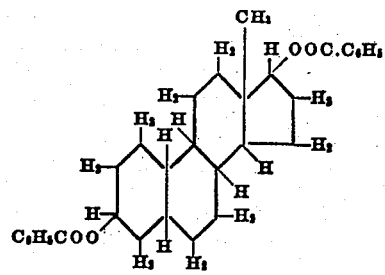

and having a physiological activity similar to that of the male germinal gland hormone.

18. Monobenzoyl octahydro follicle hormones of the following structural formula

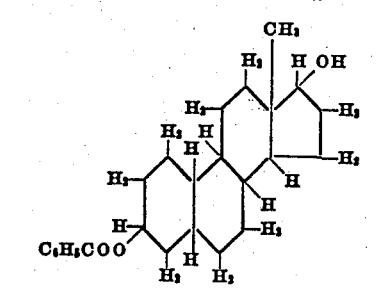

and having a physiological activity similar to that of the male germinal gland hormone.

19. A method for the production of acyl octahydro follicle hormones, which comprises subjecting unsaturated 13-monomethyl cyclopentano phenanthrene compounds having the general formula $C_{18}H_xO_2$, where $x$ is at least 18 but less than 30, to hydrogenation and acylation in any order while retaining both oxygen atoms in the molecule.

20. A method for the production of acyl octahydro follicle hormones, which comprises subjecting 13-monomethyl cyclopentano phenanthrene compounds having a hormone-like physiological activity and having the general formula $C_{18}H_xO_2$, where $x$ is of the order of 18 to 22, to hydrogenation and acylation in any order while retaining both oxygen atoms in the molecule.

21. A method for the production of acyl octahydro follicle hormones, which comprises subjecting a follicle hormone to hydrogenation and acylation in any order while retaining both oxygen atoms in the molecule.

22. A method for the production of acyl octahydro follicle hormones, which comprises subjecting an octahydro follicle hormone of the general formula $C_{18}H_{29}O_2X$, wherein $X$ represents hydrogen or an acyl group, to the action of an acylating agent.

23. Acetyloctahydrofollicle hormone having the general formula:

$$CH_3COO.C_{18}H_{28}.OY$$

wherein Y represents the acetyl group or hydrogen and corresponding to the following structural formula:

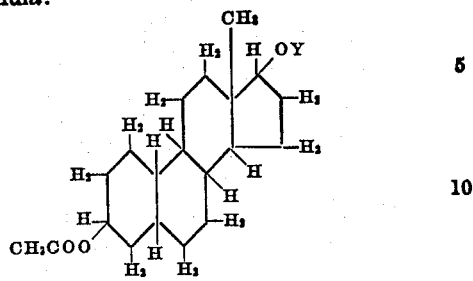

24. The method of producing saturated, acyl-substituted cyclopentano phenanthrene compounds which comprises subjecting the acyl derivative of a cyclopentano phenanthrene compound having an unsaturated aromatic first ring to a hydrogenation treatment sufficient only to cause saturation of such ring.

25. Monoacyloctahydrofollicle hormone.

26. Diacyloctahydrofollicle hormone.

FRIEDRICH HILDEBRANDT.